(12) United States Patent
Bruckman et al.

(10) Patent No.: US 7,420,922 B2
(45) Date of Patent: Sep. 2, 2008

(54) RING NETWORK WITH VARIABLE RATE

(75) Inventors: Leon Bruckman, Petah Tikva (IL); Rafi Harel, Beit Hashmonia (IL); Muly Ilan, Ramat Gan (IL)

(73) Assignee: Corrigent Systems Ltd, Tel Aviv (IL)

( * ) Notice: Subject to any disclaimer, the term of this patent is extended or adjusted under 35 U.S.C. 154(b) by 1041 days.

(21) Appl. No.: 10/387,657

(22) Filed: Mar. 12, 2003

(65) Prior Publication Data

US 2004/0179518 A1    Sep. 16, 2004

(51) Int. Cl.
*H04J 3/22* (2006.01)
*H04L 12/26* (2006.01)
*H04L 12/28* (2006.01)
*G06F 15/16* (2006.01)

(52) U.S. Cl. .................. 370/236; 370/252; 370/254; 709/208; 709/233

(58) Field of Classification Search .................. None
See application file for complete search history.

(56) References Cited

U.S. PATENT DOCUMENTS

| | | | |
|---|---|---|---|
| 5,461,611 A | 10/1995 | Drake, Jr. et al. | |
| 5,581,703 A | 12/1996 | Baugher et al. | |
| 5,706,516 A | 1/1998 | Chang et al. | |
| 5,933,422 A | 8/1999 | Kusano et al. | |
| 6,021,263 A | 2/2000 | Kujoory et al. | |
| 6,169,783 B1 | 1/2001 | Brooks et al. | |
| 6,256,292 B1 | 7/2001 | Ellis et al. | |
| 6,262,976 B1 | 7/2001 | McNamara | |
| 6,314,110 B1 | 11/2001 | Chin et al. | |
| 6,339,488 B1 | 1/2002 | Beshai et al. | |
| 6,400,681 B1 | 6/2002 | Bertin et al. | |
| 6,442,134 B1 | 8/2002 | Mitchell | |
| 6,456,407 B1 | 9/2002 | Tammela et al. | |
| 6,486,988 B1 * | 11/2002 | Lewis et al. | 398/83 |
| 6,510,141 B1 | 1/2003 | Ramfelt et al. | |
| 6,560,231 B1 | 5/2003 | Kawakami et al. | |
| 6,584,535 B1 | 6/2003 | Ouellet et al. | |
| 6,624,917 B1 | 9/2003 | Paschal et al. | |

(Continued)

OTHER PUBLICATIONS

U.S. Appl. No. 10/211,066, Office Action dated Sep. 29, 2006, 9 pages.

(Continued)

*Primary Examiner*—Wing F. Chan
*Assistant Examiner*—Gregory B Sefcheck
(74) *Attorney, Agent, or Firm*—Townsend and Townsend and Crew LLP (57) ABSTRACT

A method for changing a network characteristic or capability, such as the communication rate of network segments, software version or protocol. All nodes in the network perform the change synchronously while continuing to communicate within the existing capabilities. A new configuration is downloaded to the nodes, and a manager node exchanges validation messages with the other nodes in order to verify that the nodes can be reconfigured and will be able to complete the process successfully. The manager node then sends a command message to the other nodes to execute the change. In response, the other nodes begin substantially simultaneously to communicate in accordance with the new characteristics and/or capabilities. This method helps to minimize the duration of the upgrade process, while avoiding traffic hits and minimizing abnormal operation that may occur during the upgrade.

18 Claims, 5 Drawing Sheets

U.S. PATENT DOCUMENTS

| | | | |
|---|---|---|---|
| 6,625,155 | B1 | 9/2003 | Dziong |
| 6,639,893 | B1 | 10/2003 | Chikenji et al. |
| 6,639,896 | B1 | 10/2003 | Goode et al. |
| 6,647,008 | B1 | 11/2003 | Galand et al. |
| 6,680,912 | B1 | 1/2004 | Kalman et al. |
| 6,711,125 | B1 | 3/2004 | Walrand et al. |
| 6,731,597 | B1 | 5/2004 | Batchellor et al. |
| 6,763,025 | B2 | 7/2004 | Leatherbury et al. |
| 6,795,394 | B1 | 9/2004 | Swinkels et al. |
| 6,820,210 | B1 | 11/2004 | Daruwalla et al. |
| 6,952,397 | B2 | 10/2005 | Mor et al. |
| 6,965,612 | B2 * | 11/2005 | Chohan et al. .............. 370/465 |
| 6,992,975 | B1 | 1/2006 | Daniel et al. |
| 7,035,279 | B2 | 4/2006 | Bruckman |
| 7,042,846 | B2 | 5/2006 | Bauer |
| 7,058,008 | B1 * | 6/2006 | Wilson et al. ............... 370/216 |
| 7,158,486 | B2 | 1/2007 | Rhodes |
| 7,161,899 | B2 | 1/2007 | Limaye et al. |
| 7,184,402 | B1 | 2/2007 | Sharma et al. |
| 2002/0181479 | A1 * | 12/2002 | Okuno ........................ 370/404 |
| 2003/0076829 | A1 | 4/2003 | Rabie |
| 2003/0145108 | A1 * | 7/2003 | Joseph et al. ............... 709/239 |
| 2003/0158930 | A1 | 8/2003 | McBride |
| 2003/0223428 | A1 | 12/2003 | Blanquer Gonzalez et al. |
| 2004/0052274 | A1 * | 3/2004 | Wang et al. .................. 370/468 |
| 2004/0076176 | A1 * | 4/2004 | Kfir ........................... 370/465 |
| 2004/0105459 | A1 * | 6/2004 | Mannam ..................... 370/465 |
| 2004/0196787 | A1 | 10/2004 | Wang et al. |
| 2005/0030948 | A1 | 2/2005 | Wyatt |

OTHER PUBLICATIONS

Office Action dated Jul. 29, 2004, for related U.S. Appl. No. 09/756,946, filed Jan. 9, 2001, 14 pages.
Office Action dated Sep. 15, 2004, for related U.S. Appl. No. 09/794,898, filed Feb. 26, 2001, 10 pages.
Moy, "OSPF", Version 2, published as Request for Comments (RFC) 2328 of the Internet Engineering Task Force (IETF) Network, Working Group, Apr. 1998.
Awduche, et al., "Requirement for Traffic Engineering Over MPLS", published as IETF RFC 2702, Sep. 1999.
Jogalekar, et al., "IP over Resilient Packet Rings", (Internet Draft, draft-jogalekar-iporpr-00).
Herrera, et al., "A Framework for IP over Packet Transport Rings", (Internet Draft, draft-ietf-iporprframework-00).
Braden, et al., in IETF RFC 2205, "Resource ReServation Protocol (RVSP)—Version 1 Functional Specification", Sep. 1997.
Andersson, et al., in IETF RFC 3036, "LDP Specification" Jan. 2001.
Katz, et al., "Traffic Engineering Extensions to OSPF", (draft-katz-yeung-ospf-traffic-06.txt), Oct. 2001.
Li, et al., "IS-IS Extensions FOR Traffic Engineering", (published as draft-ietf-isis-traffic-04.txt), Aug. 2001.
D. Tsiang et al., Request for Comments (RFC) 2892 of the Internet Engineering Task Force (IETF), Aug. 2000.
"IEEE Standard for Information Technology, Telecommunications and Information Specifications, Part 3: Media Access Control (MAC) Bridges", Published as ANSI-IEEE Standard 802.1D (1998). Available at: standards.ieee.org/catalog/IEEE802.1.html.
Rosen, et al., in Request for Comments (RFC) 3031 of the Internet Engineering Task Force (IETF), entitled: "Multiprotocol Label Switching Architecture", Jan. 2001. (Available at: sss.ietf.org/rfc. html).
Martini, et al., in an IETF Draft Entitled: "Encapsulation Methods for transport of layer 2 Frames over MPLS", May 2001. (Available at: search.ietf.org/internet-drafts/draft-martini-12circuit-encap-mpls-02.txt.).
Martini, et al., Internet Draft, entitled: "Transport of Layer 2 Frames over MPLS", May 2001. (Available at: search.ietf.org/internet-drafts/draft-martini-12circuit-mpls-06.txt.).
Plummer, D., "An Ethernet address Resolution Protocol", RFC 826, Nov. 1982, pp. 109.
Finlayson, r. et al., "A Reverse Address Resolution Protocol", RFC 903, Jun. 1984, pp. 1-5.
Yavatkar, R. et al., "Subnet Bandwidth Manager", RFC 2814, May 2000, pp. 1-60.
Malkin, G., "RIP Version 2", RFC 2453, Nov. 1998, pp. 1-39.
Ethernet Technologies, "Ethernet and IEEE 802.3", http://www.cisco.com/univercd/cc/td/doc/cisintwk/ito_doc/ethernet.htm, Jun. 1999, pp. 1-21.
ITU-T Recommendation G.7042/Y.1305, Nov. 2001.
K. Sklower et al., The PPP Multilink Protocol (MP), The Internet Engineering Task Force, Aug. 1996, www.ietf.org/rfc/rfc1990.txt?number=1990, Apr. 16, 2007, pp. 1-22.
Z. Dziong et al., A Framework for Bandwidth Management in ATM Networks—Aggregate Equivalent Bandwidth Estimation Approach, IEEE/ACM Transactions on Networking, vol. 5, No. 1, Feb. 1997, pp. 134-147.
D. Olson et al., Inverse Multiplexing Over ATM, Strategic Technologies Group, Draft v3, Jul. 12, 2001, pp. i, i, 1-18.
U.S. Appl. No. 10/436,516, Office Action dated Feb. 1, 2007; 10 pages.
U.S. Appl. No. 10/211,066, Office Action dated Mar. 1, 2007, 10 pages.

* cited by examiner

RING NETWORK WITH VARIABLE RATE

FIELD OF THE INVENTION

The present invention relates generally to communication networks, and specifically to methods and devices for upgrading and controlling network data rates.

BACKGROUND OF THE INVENTION

The Synchronous Optical Network (SONET) is a group of standards that define a hierarchical set of transmission rates and transmission formats for carrying high-speed, time-domain-multiplexed (TDM) digital signals. The lowest-rate link in the SONET hierarchy is the OC-1 level, which is capable of carrying 8000 STS-1 frames per second, at a line rate of 51.840 Mbps. A STS-1 frame contains 810 bytes of data, which are conventionally organized as a block of nine rows by 90 columns. The first three columns hold transport overhead (TOH), while the remaining 87 columns carry the information payload, referred to as the synchronous payload envelope (SPE). Multiple STS-1 frames can be multiplexed (together with STS-Mc frames) into STS-N frames, for transmission on OC-N links at rates that are multiples of the basic 51.840 Mbps STS-1 rate.

While the SONET standards have been adopted in North America, a parallel set of standards, known as the Synchronous Digital Hierarchy (SDH), has been promulgated by the International Telecommunication Union (ITU), and is widely used in Europe. From the point of view of the present invention, these alternative standards are functionally interchangeable. In SDH, the information structure used for data transport is the synchronous transport module (STM), which is similar to the SONET STS frame, although the basic STM-1 rate is 155.520 Mbps. The information payload carried by STM frames is referred to as a virtual container (VC-n). The VC-3 container, with a payload rate of 48.384 Mbps, is compatible with the STS-1 SONET rate, while the VC-4 container at 149.760 Mbps is compatible with the STS-3c SONET rate. SDH conventions and data rates are described in detail in ITU-T Recommendation G.707/Y.1322 (October, 2000), entitled "Network Node Interface for the Synchronous Digital Hierarch (SDH)."

For transporting payloads that do not fit efficiently into the standard set of virtual containers, ITU-T Recommendation G.707/Y.1322 (Chapter 11) defines VC concatenation, which allows multiple virtual containers to be combined to provide a desired bandwidth. Two methods for concatenation are defined: contiguous and virtual concatenation. Both methods provide concatenated bandwidth of X times Container-N at the SDH path termination. Contiguous concatenation maintains the contiguous bandwidth through out the whole transport and is limited to X=4, 16 and 64. Virtual concatenation breaks the contiguous bandwidth into individual VCs, transports the individual VCs and recombines these VCs to a contiguous bandwidth at the end point of the transmission. Virtual concatenation requires concatenation functionality only at the path termination equipment, while contiguous concatenation requires concatenation functionality at each network element. The concatenated container, made up of X VC-N containers, is referred to as VC-N-Xc (contiguous concatenation) or VC-N-Xv (virtual concatenation). Virtual-concatenated containers are particularly useful for carrying packet data over SDH or SONET networks, wherein the bandwidth required by the packet traffic is often greater or less than the applicable standard container size.

Changing networks needs and conditions sometimes make it necessary to change the size of the concatenated containers that are in use on a given SONET/SDH link. For this purpose, ITU-T Recommendation G.7042/Y.1305 (November, 2001), which is incorporated herein by reference, defines the "Link Capacity Adjustment Scheme (LCAS) for Virtual Concatenated Signals." LCAS can be used to increase or decrease the capacity of a container that is transported in a SDH network using virtual concatenation. To change the container capacity on a virtual-concatenated link between a transmitter and a receiver, the transmitter sends control packets to the receiver, indicating the desired change and enabling the receiver to make the change in synchronization with the transmitter. The LCAS mechanism is "hitless," i.e., it is capable of adjusting the capacity of a link without interrupting or causing errors in the data traffic flowing over the link.

SUMMARY OF THE INVENTION

Although LCAS provides the means for changing the data rate of individual virtual concatenated links, it is a single-segment, point-to-point solution. When the data rate of an entire network must be changed, using LCAS or other methods known in the art, the change must be carried out segment-by-segment. In certain networks, however, such as bi-directional ring networks, all segments are expected to have the same rate. Deviations among the rates of different segments, even for a short time, can have a deleterious effect on existing traffic in the network. Furthermore, LCAS is limited to virtual-concatenated links with certain specific rates, which are assumed to be supported by the infrastructure that already exists in the underlying SONET/SDH network. When the capacity of the underlying network must be changed, normal network operation may be disrupted for an extended period.

Embodiments of the present invention provide methods and systems that can be used to change the data rate of a network rapidly and with minimal disturbance of network operation. These methods are applicable particularly to ring networks, but may be adapted for use in other network topologies, as well, such as mesh and bus topologies.

In some embodiments of the present invention, a manager node in the network supervises a synchronized rate change, which is carried out at all the nodes substantially simultaneously. This approach can be used, for example, to change the capacity of virtual-concatenated containers that are used for carrying data traffic in a ring network. Before invoking the rate change, the manager node first verifies that the change is possible, by sending validation messages over the network to the other nodes, and waiting to receive their responses. If all the responses are positive, the manager node then sends a command over the network to all the nodes to change their data rates. The nodes make the change immediately upon receiving the command or at a fixed time specified by the command. Thus, the time during which different network segments have different rates is minimized, and the disturbance of network traffic due to the change is reduced and may in some cases be substantially eliminated.

In other embodiments of the present invention, when hardware upgrades are required in order to carry out a rate change, the operation takes place in two stages: In the first stage, each segment of the network is taken off line briefly, typically by actuating protection switches in the nodes at the ends of the segment. The node interfaces of the segment are then upgraded (including hardware replacement, if necessary) to be capable of supporting both the current network rate and the new rate to which the network is to be upgraded. For example, to increase the rate of a SONET ring from STS-N to STS-4×

N, the OC-N interfaces are replaced with OC-4×N interfaces that are capable of both STS-4×N operation and channelized 4×STS-N operation. After completing the hardware upgrade on each segment, the protection switches are deactivated, and the segment is brought back on line at the current network rate (in the channelized 4×STS-N operational mode). This process continues until all the segments have been upgraded. In the second stage, the rates of all the segments are increased to the new rate, simply by reconfiguring the new hardware that has been installed. This two-stage approach permits the network rate to be changed while normal network operation continues, with minimal impact on existing network traffic.

The principles of the present invention may also be applied in performing other types of synchronous changes in a network, such as protocol changes and software upgrades. When such changes are to be made, it is typically necessary that all nodes be upgraded simultaneously, since network elements can generally communicate only if they use the same protocol formats and other communication features. Therefore, in some embodiments of the present invention, a software upgrade is downloaded to all the nodes in the network without interrupting network traffic, but is initially not activated. The manager node sends and receives validation messages to and from the other nodes, in order to verify that all the nodes are able and ready to switch in the upgraded software. The manager node then sends an execute command to all the other nodes, and the new software is immediately switched on throughout the network.

There is therefore provided, in accordance with an embodiment of the present invention, a method for controlling a network that includes a manager node and a plurality of other nodes, which are interconnected by communication links, the method including:

arranging the nodes to communicate with one another over the network at multiple different data rates, including at least a first rate and a second rate;

exchanging validation messages between the manager node and the other nodes, while the nodes are configured to communicate at the first rate, in order to verify that the nodes can be reconfigured to communicate at the second rate;

in response to the validation messages, sending a command message from the manager node to the other nodes, instructing the other nodes to execute a rate change; and in response to the command message, reconfiguring the other nodes substantially simultaneously to begin communicating at the second rate.

In an aspect of the invention, exchanging the validation messages includes sending a commit request from the manager node to the other nodes, indicating the rate change that is to be executed, and sending a ready response to the manager node from each of the other nodes that is prepared to execute the rate change. Typically, sending the command message includes sending the command message only if the manager node receives the ready response from all the other nodes within a predetermined time after sending the commit request, and failing the rate change otherwise. Additionally or alternatively, reconfiguring the other nodes includes executing the rate change only if the command message is received at each of the other nodes within a predetermined time after sending the ready response. Further additionally or alternatively, reconfiguring the other nodes includes waiting for a predetermined time after receiving the command message at each of the other nodes, and then executing the rate change at each of the other nodes.

In one embodiment, the network includes a synchronous digital communication network, and arranging the nodes includes linking the nodes to communicate by transmitting and receiving virtual-concatenated containers of different, first and second sizes over segments of the synchronous digital communication network. Typically, the synchronous digital communication network includes a SONET or SDH ring network, and reconfiguring the other nodes includes applying a Link Capacity Adjustment Scheme (LCAS) for Virtual Concatenated Signals in order to change the sizes of the virtual-concatenated containers.

There is also provided, in accordance with an embodiment of the present invention, a method for changing a communication rate of a network from a first rate to a second rate, wherein the network includes a plurality of nodes interconnected in a ring by network segments, the method including:

a hardware upgrade stage, which includes, on each network segment in sequence among at least some of the segments in the network:

actuating protection switches in the nodes that are connected to the network segment so as to divert communication traffic from the network segment;

while the communication traffic is diverted, upgrading interface hardware in the nodes connected to the network segment so that the interface hardware is capable of operating at both the first and second rates;

setting the upgraded interface hardware to operate at the first rate; and resetting the protection switches so that the communication traffic flows through the network segment; and a rate configuration stage, performed when the interface hardware in the nodes connected to all the segments in the network is capable of operating at both the first and second rates, the rate configuration stage including, on each network segment in sequence among the segments in the network:

actuating the protection switches in the nodes connected to the network segment so as to divert the communication traffic from the network segment;

while the communication traffic is diverted, setting the upgraded interface hardware in the nodes connected to the network segment to operate at the second rate; and resetting the protection switches so that the communication traffic flows through the network segment.

In one embodiment, the second rate is a multiple of the first rate, and setting the upgraded interface hardware to operate at the first rate includes configuring the upgraded interface hardware to receive and transmit multiple channels at the first rate. Typically, the network includes a synchronous digital communication network, and wherein the second rate is four times the first rate.

There is additionally provided, in accordance with an embodiment of the present invention, communication apparatus, including a manager node and a plurality of other nodes, which are interconnected by a network of communication links and are adapted to communicate with one another over the network at multiple different data rates, including at least a first rate and a second rate, wherein the manager node and the other nodes are adapted to exchange validation messages, while the nodes are configured to communicate at the first rate, in order to verify that the nodes can be reconfigured to communicate at the second rate, and wherein the manager node is adapted, in response to the validation messages, to send a command message to the other nodes, instructing the other nodes to execute a rate change, and wherein the other nodes are adapted, in response to the command message, to execute the rate change substantially simultaneously so as to begin communicating at the second rate.

There is further provided, in accordance with an embodiment of the present invention, a method for controlling a network that includes a manager node and a plurality of other nodes, which are interconnected by communication links, the method including:

arranging the nodes to communicate with one another over the network under control of a first version of software running on the nodes;

downloading a second version of the software to the nodes, while the nodes continue to communicate under the control of the first version of the software;

exchanging validation messages between the manager node and the other nodes, while the nodes are communicating under the control of the first version of the software, in order to verify that the nodes can be reconfigured to communicate under the control of the second version of the software;

in response to the validation messages, sending a command message from the manager node to the other nodes, instructing the other nodes to execute a software change; and in response to the command message, reconfiguring the other nodes substantially simultaneously to begin communicating under the control of the second version of the software.

In an embodiment of the invention, arranging the nodes includes configuring the nodes to communicate according to a predetermined communication protocol, and reconfiguring the other nodes includes altering the communication protocol. In another embodiment, arranging the nodes includes configuring the nodes to communicate at a first rate, and reconfiguring the other nodes includes reconfiguring the nodes to communicate at a second rate, which is different from the first rate.

In a further embodiment, each of the nodes includes redundant first and second hardware elements, and downloading the second version includes installing the second version on the second hardware element while using the first hardware element to communicate under the control of the first version of the software, and reconfiguring the other nodes includes reconfiguring the nodes to communicate using the second hardware element. Typically, reconfiguring the other nodes includes actuating a protection switch to toggle between the first and second hardware elements. The method may include repeating the steps of downloading the second version, exchanging the validation messages, sending the command message and reconfiguring the other nodes so as to install and activate the second version of the software on the first hardware element.

There is moreover provided, in accordance with an embodiment of the present invention, communication apparatus, including a manager node and a plurality of other nodes, which are interconnected by a network of communication links and are adapted to communicate with one another over the network under control of a first version of software running on the nodes while a second version of the software is downloaded to the nodes, wherein the manager node and the other nodes are adapted to exchange validation messages while the nodes are communicating under the control of the first version of the software, in order to verify that the nodes can be reconfigured to communicate under the control of the second version of the software, and wherein the manager node is adapted, in response to the validation messages, to send a command message from the manager node to the other nodes, instructing the other nodes to execute a software change, and wherein the other nodes are adapted, in response to the command message, to execute the software change substantially simultaneously so as to begin communicating under the control of the second version of the software.

The present invention will be more fully understood from the following detailed description of the embodiments thereof, taken together with the drawings in which:

DETAILED DESCRIPTION OF EMBODIMENTS

Figure 1:
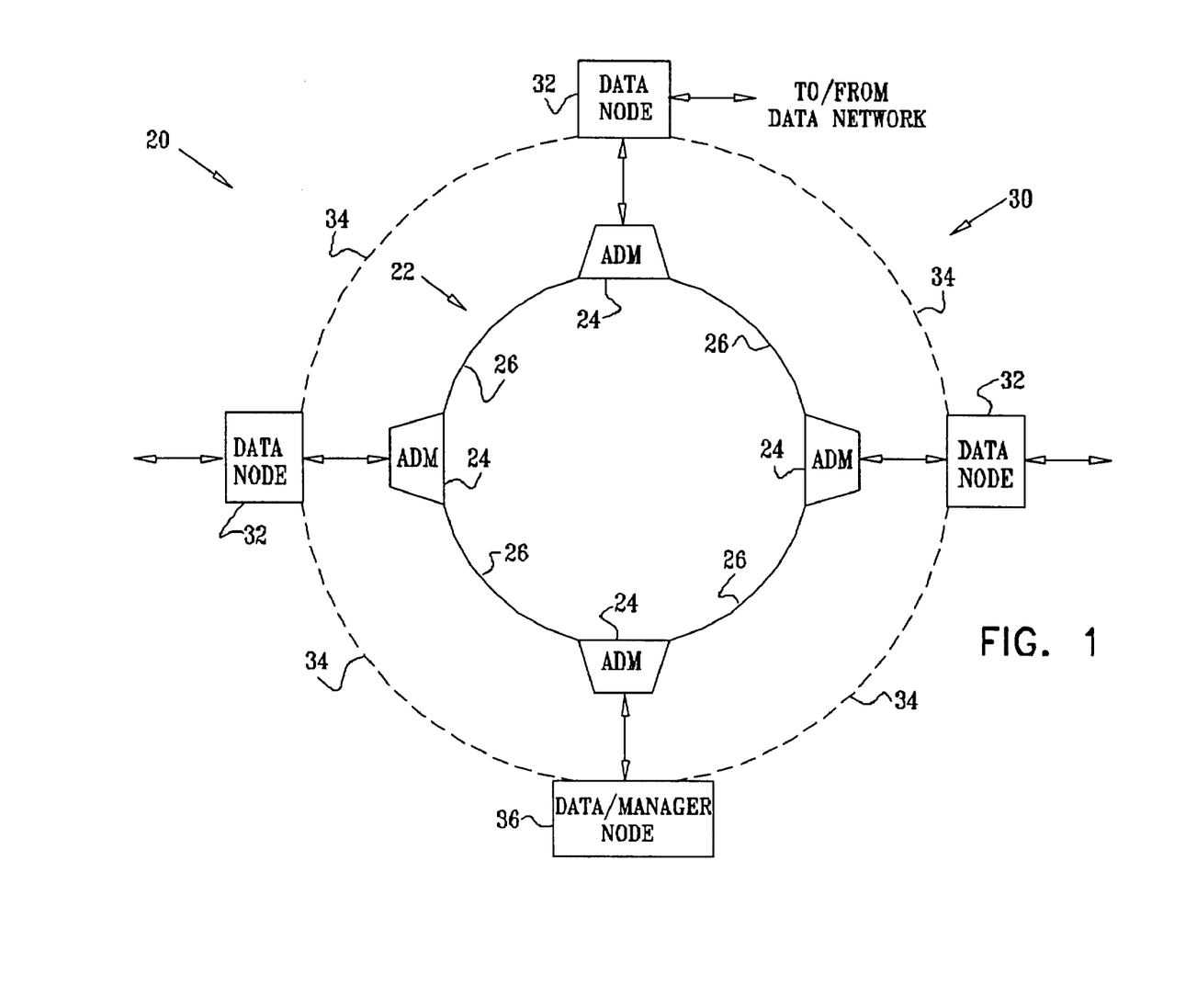
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 is built around a high-speed ring network 22, such as a SONET or SDH network, with add/drop multiplexers (ADMs) 24 at the nodes of the ring, as are known in the art. Each pair of ADMs is connected by a physical network segment 26, which typically comprises a pair of fiberoptic links that are configured to carry synchronous data traffic in clockwise and counterclockwise directions around the ring. The topology of system 20 is shown here by way of example, to illustrate aspects of the present invention. It will be understood, however, that the present invention is in no way limited in its applicability to this topology, and may equally be applied in other network systems, as well.

Network 22 serves as the infrastructure for a virtual packet communication network 30, comprising data nodes 32 connected by virtual links 34, which correspond to segments 26. One of the data nodes also serves as a manager node 36, performing functions that are described hereinbelow. For example, data nodes 32 may be connected to external Ethernet networks (not shown in the figure), and may package the Ethernet packets in virtual-concatenated containers provided by network 22. Networks 22 and 30 may also be configured to serve as a bi-directional Resilient Packet Ring (RPR) network, as defined by IEEE standard 802.17. Alternatively or additionally, system 20 may be configured to support traffic of other types, in accordance with other protocols that are known in the art.

Figure 2:
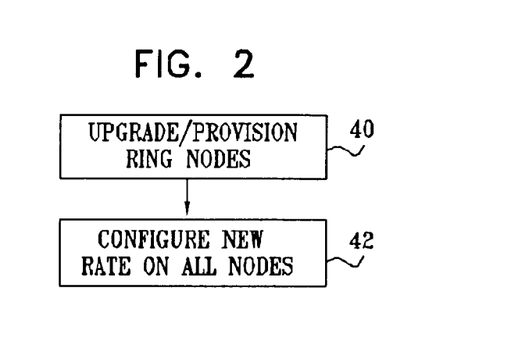
FIG. 2 is a flow chart that schematically illustrates a method for changing the rate of a communication network, in accordance with an embodiment of the present invention.

FIG. 2 is a flow chart that schematically illustrates a method for changing the data rate of system 20, in accordance with an embodiment of the present invention. As shown in this figure, the data rate change is carried out as a two-stage process. FIG. 2 shows the process in conceptual terms, while specific examples of implementation are described below with reference to FIGS. 3 and 4.

In an infrastructure upgrade step 40, an operator of system 20 prepares ADMs 24 for the rate change. This preparation may include changing the node interface hardware to support a higher data rate on underlying network 22. The hardware upgrade is performed at both ends of each of segments 26 in turn, while using protection switching to divert traffic from the segment being upgraded, as described below with reference to FIG. 4. In other words, rather than interrupting traffic on the entire network while the upgrade is in progress, the traffic is diverted from one segment at a time, typically using existing means of failure protection. Network traffic continues to flow with minimal interruption while the upgrade is going on.

Alternatively, if the existing hardware is capable of supporting a desired rate change on virtual network 30, step 40 may simply comprise provisioning the time slots on network 22 that are to be added to or removed from the virtual concatenation group assigned to network 30. In this case, as well, protection switching may be used on each segment 26 while any necessary hardware adjustment or reprogramming is performed. If LCAS is used, it is sufficient for the operator to make the change at the interface at one end of each segment (typically the same end—referred to as "east" or "west"—of all segments), and the provisioning will be carried out automatically on the interface at the other end of the segment. Alternatively, the operator may carry out the provisioning manually at both ends of each segment.

Upon completion of step 40, all of ADMs 24 are ready for the rate change, but all segments of networks 22 and 30 are still operating at the same, original rates. The ADMs and/or data nodes 32 are then reconfigured to operate at the new rate, at a configuration step 42. When the change affects the rate of underlying network 22, it may be necessary to again take each of segments 26 off-line briefly, as described below with reference to FIG. 4. Alternatively, when the rate of network 30 is to be changed without requiring hardware reconfiguration of ADMs 24, step 42 may be performed by all of nodes 32 in synchronization, using the method of FIG. 3.

Figure 3:
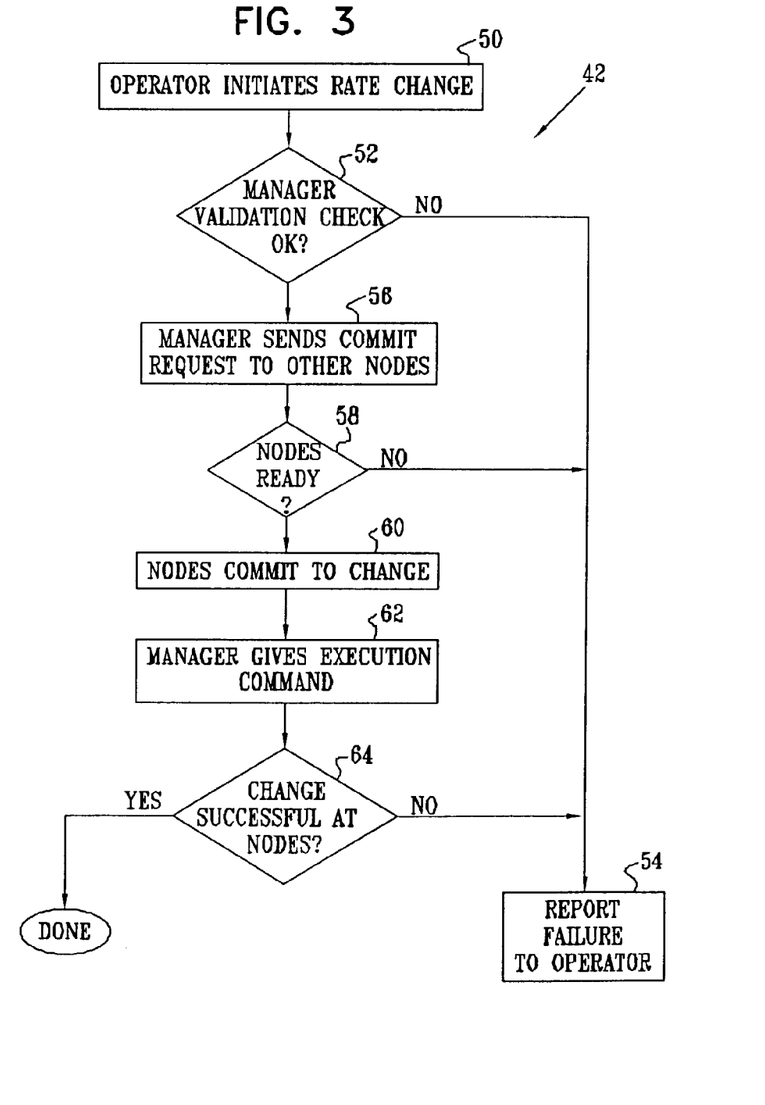
FIG. 3 is a flow chart that schematically shows details of a method for performing a synchronized rate change in a communication network, in accordance with an embodiment of the present invention.

FIG. 3 is a flow chart that schematically illustrates a synchronized method for reconfiguring the rate of network 30, in accordance with an embodiment of the present invention. This method is one way of implementing step 42 in the method of FIG. 2. It is assumed that the required time slots have already been provisioned on network 22.

A network operator initiates the rate change by inputting an appropriate rate change command to manager node 36, at an initiation step 50. In response to the command, before actually carrying out the rate change, the manager node performs a validation process to ensure that the change is possible, beginning at a manager validation step 52. The manager node first checks its own records to ensure that there is no condition in system 20 that could impede the rate change. This step includes verifying, for example, that the following conditions are satisfied:

1. No other rate change process is currently in progress or was initiated but not completed successfully.
2. There are no known faults or failures in system 20 that could prevent successful completion of the rate change.
3. The new rate that is requested on network 30 does not conflict with predefined bandwidth profiles. (This criterion may be important particularly when the new rate is lower than the current rate.)

If any of the validation conditions is not satisfied, manager node 36 exits from the rate change process and reports the failure to the operator, at a failure step 54.

If step 52 is successful, manager node 36 begins the second part of the validation process, by sending a commit request to the remaining nodes 32, at a node validation step 56. A communication protocol between nodes 32 and 36 is defined for this purpose. The protocol may be based on a network management communication protocol known in the art, running over a standard transport protocol, such as UDP, with appropriate extension for the purposes of the present invention.

Upon receiving the commit request, each of nodes 32 verifies that it is ready to make the rate change, at a node validation step 58. The conditions verified by nodes 32 may include, for example:

1. No other rate change process is currently in progress or was initiated but not completed successfully.
2. The new rate that is requested on network 30 does not conflict with the provisioned ring interface bandwidth.
3. The segments 26 of network 22 to be involved in the rate change are properly connected to the corresponding ADM 24 and are configured for the change.

The third condition—verifying that the paths to be used on network 22 are ready—can be checked by invoking mechanisms provided by the above-mentioned SONET and SDH standards. For example, a path trace identifier message (known as TIM-P) may be sent from one ADM 24 to its neighbor. The ADM receiving this message normally checks it against its own records and, if there is a mismatch, issues a path trace identifier mismatch alarm. If TIM-P or any of the other applicable conditions fails at any of nodes 32, the node sends a "not-ready" message to manager node 36, which then exits and reports the failure at step 54.

Upon verifying that it is able and ready to make the requested change, however, each of nodes 32 commits to the change and sends a "ready" message to manager node 36, at a commitment step 60. If manager node 36 has not received a positive, ready message from all nodes 32 within a predefined timeout period, it exits and reports the failure at step 54. After receiving ready messages from all the participating nodes, manager node 36 sends an execute command to all the nodes, at an execution step 62. The manager node then exits and reports to the operator that it has successfully completed its part in the rate change process.

After receiving the execute command sent at step 62, nodes 32 wait a short time, typically about one second, and then carry out the change, at a node rate change step 64. The reason for waiting this short time is to ensure that all the other nodes have also received the execute command before the change is carried out, since the rate change may briefly interrupt traffic on network 34 and might otherwise prevent one or more of the other nodes from receiving the execute command. The rate change is thus carried out by all the nodes substantially simultaneously, to within the propagation delay of the command messages within system 20. The change may be carried out by the nodes using LCAS, in order to avoid causing any traffic "hits" during the change. Alternatively, each of the nodes may simply perform the change individually, which may cause a brief traffic disturbance. If any of the nodes has not received the execute command within a predefined timeout period of the time at which it sent its "ready" message, it exits and reports the failure to the operator at step 54.

Upon completion of the rate change, nodes 32 report to the network operator that they have successfully changed their transmission rates. If any of the nodes has been unable to change its rate for some reason, it likewise reports the failure to the manager. The node may continue retrying the rate change until appropriate maintenance steps are taken.

Figure 4:
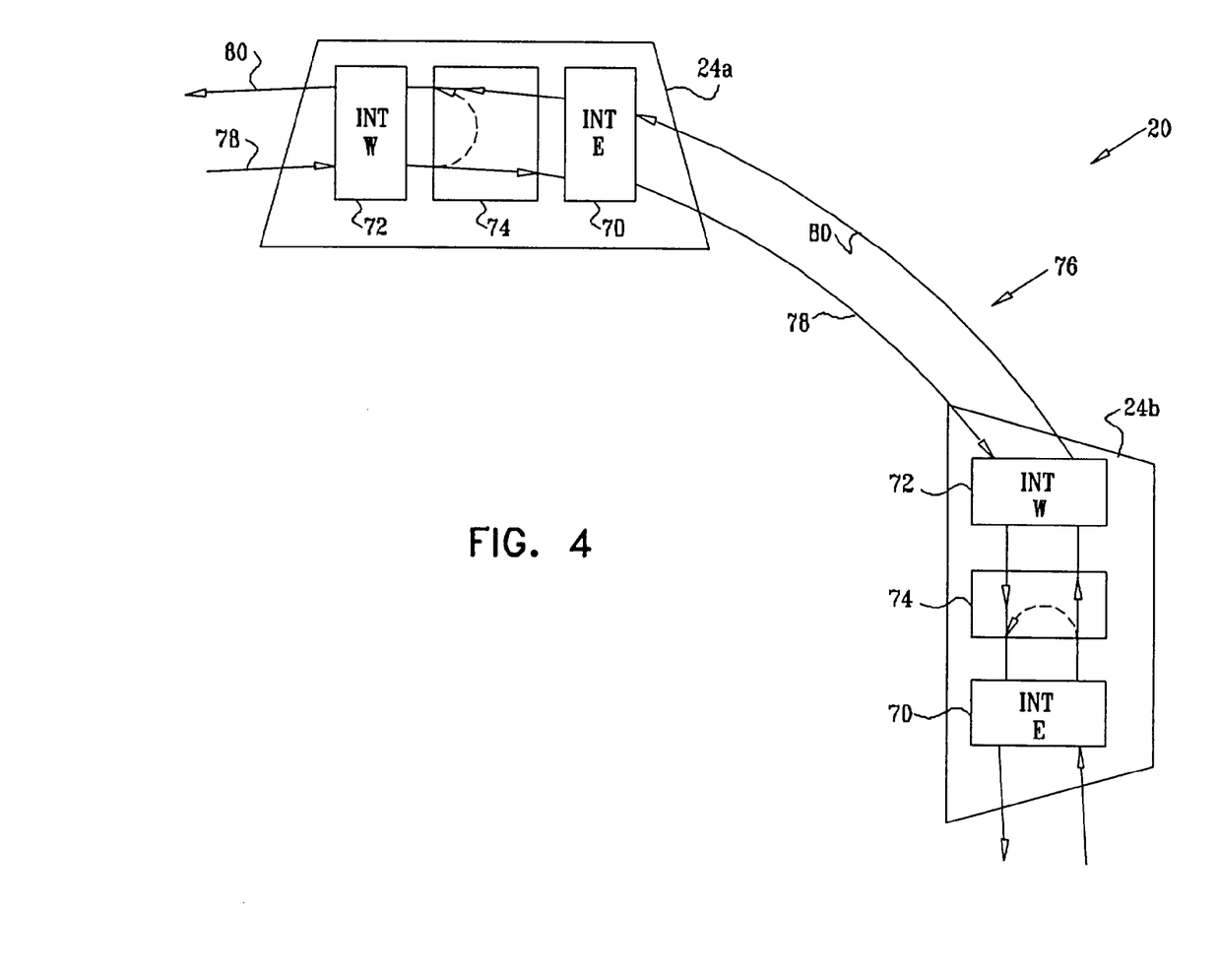
FIG. 4 is a block diagram that schematically shows details of a segment of a communication network, in accordance with an embodiment of the present invention.

FIG. 4 is a block diagram that schematically shows details of ADMs 24a and 24b in network 22, illustrating a method for changing the rate of the network, in accordance with an embodiment of the present invention. This embodiment is appropriate for cases in which an upgrade of the capacity of network 22 is required, for example, an upgrade from OC-48 to OC-192. For the sake of clarity and simplicity, FIG. 4 shows only those elements of the ADMs that are actually involved in the rate change, while other elements, such as the connections between the ADMs and nodes 32, are omitted.

Each ADM 24 comprises an "east" interface 70 and a "west" interface 72. East interface 70 of ADM 24a is connected by a segment 76 of network 22 to west interface 72 of ADM 24b, and so on around the ring. Each segment 76 typically comprises redundant fiberoptic links 78 and 80, which are respectively configured at the interfaces to carry traffic clockwise and counterclockwise around the network. The terms "east," "west," "clockwise" and "counterclockwise" are used here arbitrarily, simply to distinguish the two interfaces and directions of traffic around the ring network, as is common in the SONET/SDH art. These terms have no actual geographical or physical meaning in this context.

Referring back to the model of FIG. 2, it is assumed initially that interfaces 70 and 72 comprise OC-48 cards. In preparation for the rate upgrade, these cards are to be replaced at step 40 with OC-192 cards that are capable of operating in both contiguous and channelized STS-192 modes (supporting both STS-192c and 4×STS-48c communication rates). The card replacement is performed segment by segment, as noted above. To perform the replacement on segment 76, protection switches 74 are actuated in ADMs 24a and 24b to wrap traffic away from this segment. In other words, switch 74 of ADM 24a wraps incoming traffic on link 78 back through west interface 72 of ADM 24a onto link 80, while switch 74 of ADM 24b wraps traffic back through east interface 70 of ADM 24b. In accordance with SONET/SDH standards, actuating the protection switch typically interrupts traffic for less than 50 ms. After the switching is completed, system 20 continues to operate normally. While switches 74 are actuated in this manner, east interface 70 of ADM 24a and west interface 72 of ADM 24b are replaced with the new OC-192 cards. These cards are configured at this stage for 4×STS-48c channelized operation. After the replacement is completed, switches 74 are cleared to their normal positions (non-wrapping), and traffic resumes on segment 76. Only one of the four available STS-48c channels is used at this stage.

The hardware replacement process is repeated on each of the segments of network 22. Although a brief traffic hit occurs each time switches 74 are actuated or cleared, there is typically no time during which system 20 is unavailable for communications. Furthermore, all the segments of network 22 continue to operate at the same rate while step 40 is in progress, without rate mismatches among the different segments.

After completing the hardware upgrade on all segments of network 22, all of ADMs 24 are reconfigured to operate at the new, OC-192 rate (STS-192c) in step 42. In this case, step 42 can be performed either segment by segment, or simultaneously as in the method of FIG. 3. Although the method of FIG. 3 has the advantage of rapid execution, if ADMs 24 do not support this sort of synchronized execution, the segment-by-segment method can be used, as illustrated by FIG. 4. In this case, in order to reconfigure the rate of segment 76, protection switches 74 are again actuated. East interface 70 of ADM 24a and west interface 72 of ADM 24b are then reconfigured from 4×STS-48c channelized operation to non-channelized STS-192c. In other words, the interfaces are redefined to support a STS-192c path on segment 76, rather than four STS-48c paths. When the redefinition is complete—typically a matter of no more than a few minutes—switches 74 are cleared, and segment 76 returns to operation as an OC-192 link.

Step 42 is repeated successively over the remaining segments of network 22. Again, the use of protection switching at this step means that some traffic hits will occur, but overall system 20 will continue operating normally without substantial interruption of service. Step 42 is preferably performed over all the segments of the network in succession as rapidly as possible in order to avoid difficulties that may be caused by rate mismatches among the different segments while the rate reconfiguration is in process.

Figure 5:
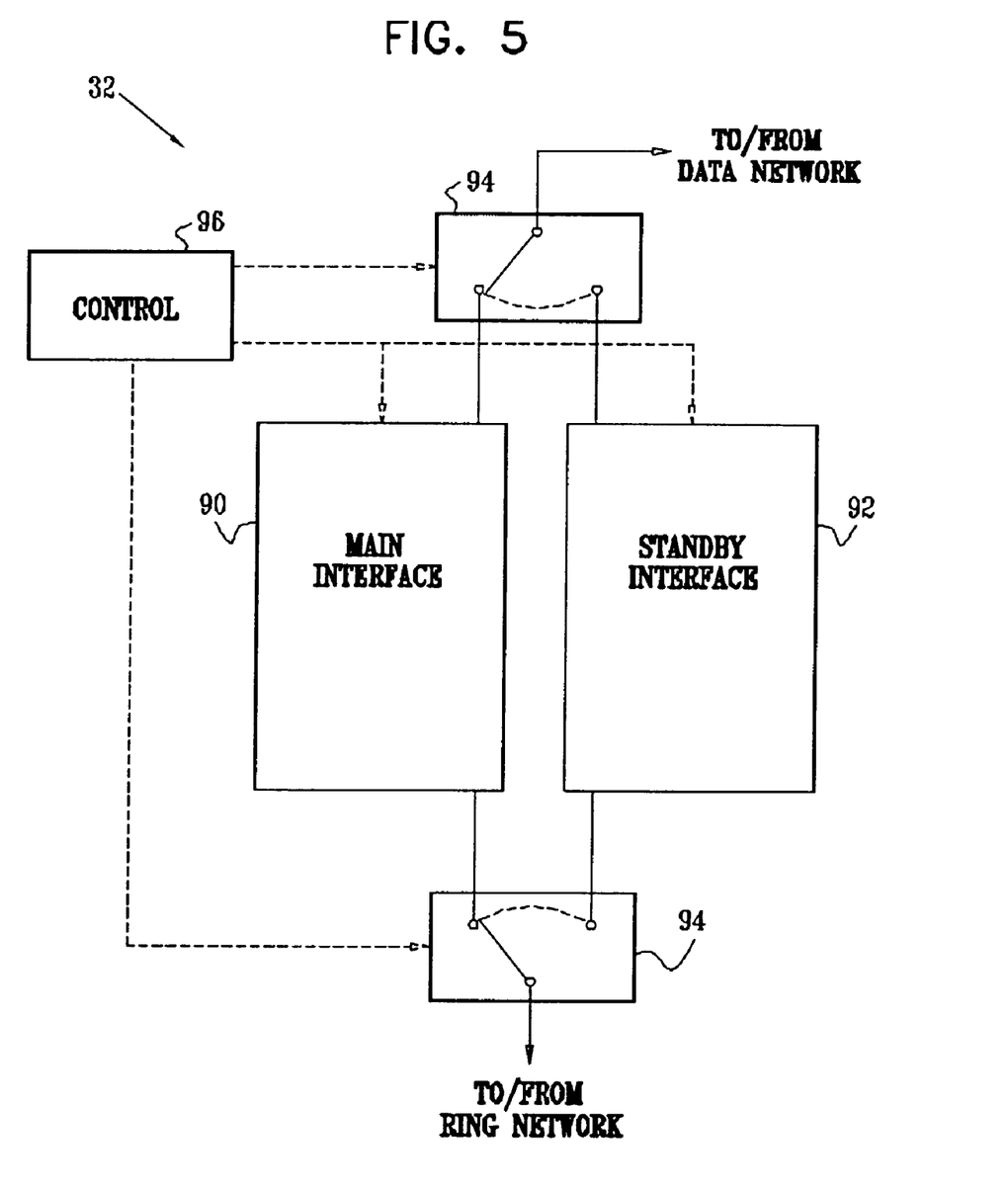
FIG. 5 is a block diagram that schematically shows details of a network communication node, in accordance with an embodiment of the present invention.
Figure 6:
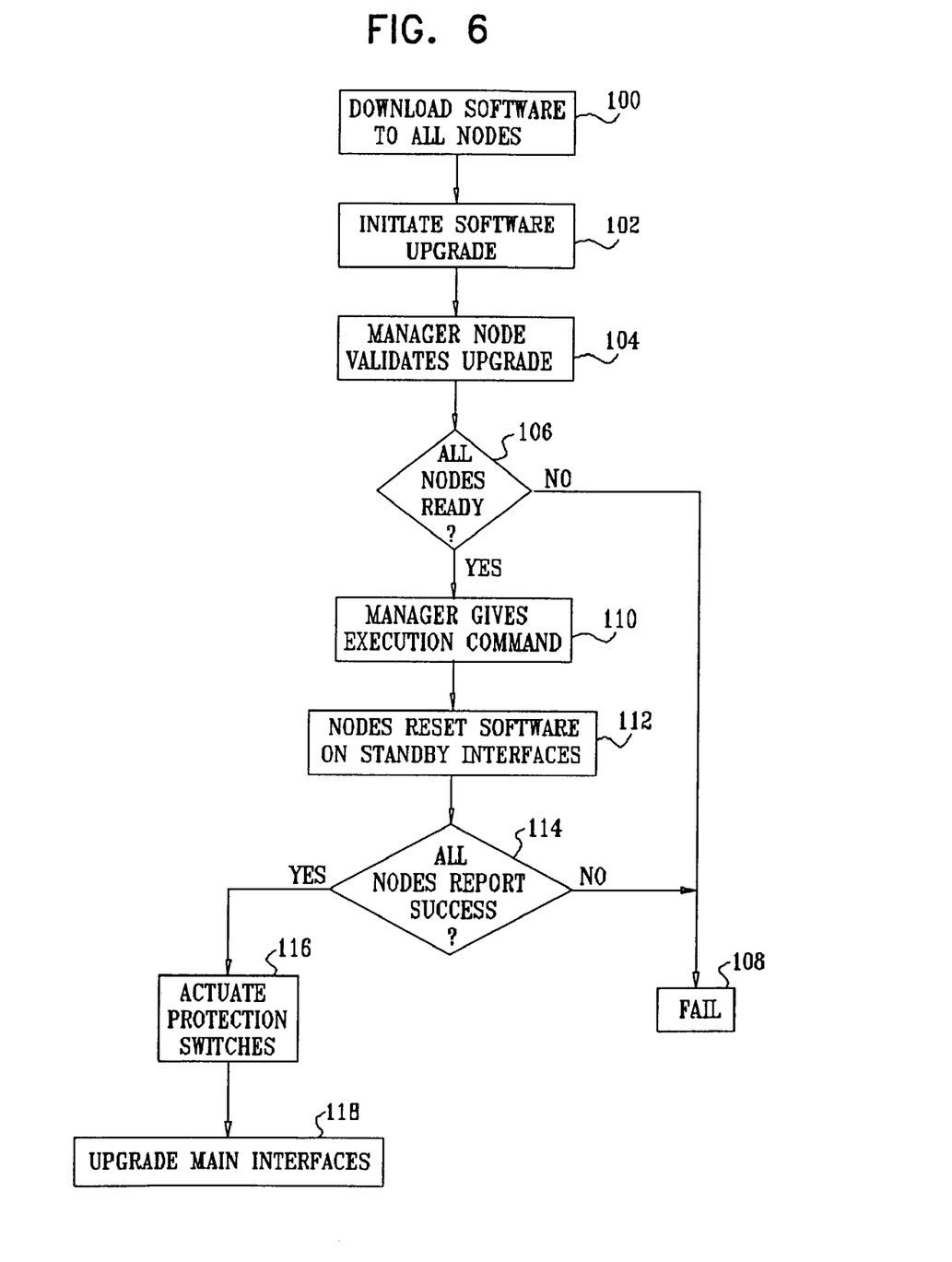
FIG. 6 is a flow chart that schematically illustrates a method for performing a synchronized software upgrade in a communication network, in accordance with an embodiment of the present invention.

Reference is now made to FIGS. 5 and 6, which schematically illustrate a method for carrying out a synchronized software upgrade on nodes 32 of network 30, in accordance with an embodiment of the present invention. This sort of upgrade can be used, for example, to make changes in the frame format or other aspects of the communication protocol used by nodes 32. (Such changes are common particularly when network 30 implements new and evolving communication standards.) Alternatively, the method described hereinbelow can be used to carry out substantially any sort of node software upgrade, while minimizing or even eliminating the interruption of network traffic that could otherwise be caused while performing the upgrade.

FIG. 5 is a block diagram that schematically shows elements of one of nodes 32. Typically, node 32 comprises a redundant pair of interface cards: a main interface card 90, and a standby interface card 92. Ordinarily, the main interface card is active in carrying communication traffic, between ring network 22 and an external data network, for example. The standby card takes over only in the case of a failure in the main interface card or when otherwise required for maintenance purposes. Protection switches 94 are actuated by a controller 96, in order to switch traffic from the main interface card to the standby card when required. FIG. 6 is a flow chart showing the steps in a method that takes advantage of this redundancy in order to perform a synchronized software upgrade at all of nodes 32 and 36, without taking network 30 off line.

The method of FIG. 6 begins with downloading of a new software version to local memory on all of nodes 32 and 36, at a download step 100. The new version may, for example, change the framing format of data exchanged among the nodes, or it may make other changes or extensions to the existing protocol used in communication among the nodes. Generally speaking, these sorts of changes should be introduced at all the nodes at the same time in order to maintain communication compatibility within the network. The software downloaded at step 100 is installed on standby cards 92 in all the nodes, while main cards 90 continue to communicate in accordance with the old version. The download may be carried out by an operator of the network at each node individually, or it may alternatively be performed centrally via network 30, through a management console connected to manager node 36, for example, if nodes 32 are capable of accepting this sort of remote download. In any case, although the new software version is installed at this stage, it is not yet active, i.e., if any of standby cards 92 must be activated due to a failure in the corresponding main card 90, the standby card will operate in accordance with the old software version. The new software may be downloaded to main cards 90 at the same time, without activating the new software on the main cards either.

Once the operator has completed the new software download on all of nodes 32 and 36, he or she initiates the software upgrade by inputting an appropriate command to manager node 36, at an upgrade initiation step 102. The manager node then checks its own records to verify that the upgrade is possible, and if so, sends commit requests to all of nodes 32, at a validation step 104. The validation procedure and messaging involved in this step are similar to those described above with reference to FIG. 3. The description is abridged here for the sake of brevity. Nodes 32 check their own status and records to verify that they are able and ready to perform the requested upgrade. At this stage, for example, controller 96 in each node may verify that the new software has been properly installed on standby card 92 and that protection switches 94 are in their normal positions. Upon verifying that the upgrade is now possible, nodes 32 send "ready" messages to manager node 36, at a commitment step 106. If manager node 36 is unable to validate the upgrade at this stage, because of either an issue in its own records or a failure to receive "ready" messages from all of nodes 32, it aborts the upgrade, at a failure step 108, and reports the failure to the network operator.

On the other hand, if all of nodes 32 report that they are ready, manager node 36 gives the other nodes an execute command, at an execution step 110. Upon receiving the command, nodes 32 immediately reset their standby cards 92, so that the new software version now becomes active, at a software reset step 112. Controller 96 in each node 32 verifies that the reset operation was carried out successfully, and reports the success or failure of the operation to manager node 36, at a reporting step 114. Again, if any of nodes 32 fails to report a successful reset, manager node 36 alerts the network operator to the failure at step 108, so that appropriate maintenance action can be taken.

Upon receiving notification that all of standby cards 92 have been successfully reset with the new software version, manager node 36 instructs all of nodes 32 to actuate their protection switches 94, at a protection step 116. Controllers 96 actuate the protection switches either immediately upon receiving the message, or after a short, predetermined waiting period, as described above. At this point, all of nodes 32 and 36 begin communicating in accordance with the new software version, by means of their standby cards 92. The procedure of steps 104 through 116 can now be repeated in order to upgrade the software version on main cards 90, as well.

The method of FIGS. 5 and 6 takes advantage of the existence of redundant components in nodes 32. Alternatively, as in the case of the network rate change described above with reference to FIG. 3, the software reset at step 112 may be carried out on active components of nodes 32, while the nodes continue to communicate with one another. In this case, of course, there is a greater possibility of traffic interruptions in network 30 during the changeover, but the interruptions will generally be brief.

Although the embodiments described above are based on synchronous digital communication networks, and specifically on SONET and SDH networks, the principles of the present invention may similarly be applied, mutatis mutandis, to networks of other types, particularly ring networks, as well as mesh and bus networks. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for controlling a network that includes a manager node and a plurality of other nodes, which are interconnected by communication links, the method comprising:
    arranging the nodes to communicate with one another over segments of the network at multiple different data rates, comprising at least a first rate and a second rate, each segment connecting a different, respective pair of the nodes;
    exchanging validation messages between the manager node and the other nodes, while the nodes are configured to communicate at the first rate, in order to verify that the nodes can be reconfigured to communicate at the second rate;
    in response to the validation messages, sending a command message from the manager node to the other nodes, instructing the other nodes to execute a rate change; and
    in response to the command message, reconfiguring three or more of the other nodes substantially simultaneously to begin communicating at the second rate over a plurality of the segments in the network that interconnect the three or more of the other nodes.

2. The method according to claim 1, wherein exchanging the validation messages comprises sending a commit request from the manager node to the other nodes, indicating the rate change that is to be executed, and sending a ready response to the manager node from each of the other nodes that is prepared to execute the rate change.

3. The method according to claim 2, wherein sending the command message comprises sending the command message only if the manager node receives the ready response from all the other nodes within a predetermined time after sending the commit request, and failing the rate change otherwise.

4. The method according to claim 2, wherein reconfiguring the other nodes comprises executing the rate change only if the command message is received at each of the other nodes within a predetermined time after sending the ready response.

5. The method according to claim 1, wherein reconfiguring the other nodes comprises waiting for a predetermined time after receiving the command message at each of the other nodes, and then executing the rate change at each of the other nodes.

6. The method according to claim 1, wherein the network comprises a synchronous digital communication network, and wherein arranging the nodes comprises linking the nodes to communicate by transmitting and receiving virtual-concatenated containers of different, first and second sizes over the segments of the synchronous digital communication network.

7. The method according to claim 6, wherein the synchronous digital communication network comprises a SONET or SDH ring network.

8. The method according to claim 6, wherein reconfiguring the other nodes comprises applying a Link Capacity Adjustment Scheme (LCAS) for Virtual Concatenated Signals in order to change the sizes of the virtual-concatenated containers.

9. The method according to claim 1, wherein the segments interconnect the nodes in a ring, and wherein reconfiguring the three or more of the other nodes comprises causing the nodes to begin communicating at the second rate over all of the segments in the ring.

10. A communication system, comprising a manager node and a plurality of other nodes, which are interconnected by segments of a network of communication links, each segment connecting a different, respective pair of the nodes, and are configured to communicate with one another over the network at multiple different data rates, comprising at least a first rate and a second rate,     wherein the manager node and the other nodes are configured to exchange validation messages, while the nodes are configured to communicate at the first rate, in order to verify that the nodes can be reconfigured to communicate at the second rate, and     wherein the manager node is configured, in response to the validation messages, to send a command message to the other nodes, instructing the other nodes to execute a rate change, and     wherein the other nodes are configured, in response to the command message, to execute the rate change substantially simultaneously at three or more of the other nodes so as to begin communicating at the second rate over a plurality of the segments in the network that interconnect the three or more of the other nodes.

11. The system according to claim 10, wherein the manager node is configured to send a commit request to the other nodes, indicating the rate change that is to be executed, and wherein the other nodes are configured to send a ready response to the manager node indicating that they are prepared to execute the rate change.

12. The system according to claim 11, wherein the manager nodes is configured to send the command message only if the manager node receives the ready response from all the other nodes within a predetermined time after sending the commit request, and to fail the rate change otherwise.

13. The system according to claim 11, wherein each node among the other nodes is configured to execute the rate change only if the command message is received at the node within a predetermined time after sending the ready response.

14. The system according to claim 10, wherein the other nodes are configured to wait for a predetermined time after receiving the command message before executing the rate change.

15. The system according to claim 10, wherein the network comprises a synchronous digital communication network, and wherein the nodes are configured to communicate by transmitting and receiving virtual-concatenated containers of different, first and second sizes over the segments of the synchronous digital communication network.

16. The system according to claim 15, wherein the synchronous digital communication network comprises a SONET or SDH ring network.

17. The system according to claim 15, wherein the nodes are configured to apply a Link Capacity Adjustment Scheme (LCAS) for Virtual Concatenated Signals in order to change the sizes of the virtual-concatenated containers.

18. The system according to claim 10, wherein the segments interconnect the nodes in a ring, and wherein the nodes are configured to execute the rate change so as to begin communicating at the second rate over all of the segments in the ring.

\* \* \* \* \*